United States Patent [19]

Reagan et al.

[11] 4,303,918

[45] Dec. 1, 1981

[54] GAS PANEL WITH IMPROVED DRIVE CIRCUITS

[75] Inventors: Michael G. Reagan, Enterprise; Bruce Pelkey, Longwood, both of Fla.

[73] Assignee: NCR Corporation, Dayton, Ohio

[21] Appl. No.: 113,942

[22] Filed: Jan. 21, 1980

[51] Int. Cl.[3] .............................................. G06F 3/14

[52] U.S. Cl. ................................ 340/778; 315/169.1; 340/811

[58] Field of Search ............... 340/778, 777, 805, 811; 315/169.1-169.4

[56] References Cited

U.S. PATENT DOCUMENTS 3,946,381 3/1976 Johnson et al. .................... 340/778

3,991,416 11/1976 Byles et al. .......................... 340/805

4,027,196 5/1977 Criscimagna et al. .............. 340/778

OTHER PUBLICATIONS

*High-Level Driver for Gas Discharge Panel*; Kleen; IBM Tech. Discl. Bull.; vol. 16, #9; 2/74; pp. 2941-2942.

*Primary Examiner*—Marshall M. Curtis
*Attorney, Agent, or Firm*—J. T. Cavender; Wilbert Hawk, Jr.; Richard W. Lavin

[57] ABSTRACT

A driving circuit for a gas-discharge display device includes a pair of switching members and the secondary windings of a transformer wired in series with one of the switching members. The switching members in response to receiving out-of-phase control signals alternately apply a low voltage pulse to the display device. The secondary windings of the transformer output continuously a high voltage pulse in phase with one of the switching members. Upon the generation of appropriate control signals enabling the operation of the switching members, a voltage of sufficient magnitude is applied to selected cell segments in the display device to fire the cells. The transformer together with the low voltage pulses are driven by a high frequency clock to provide a high intensity display operation.

14 Claims, 11 Drawing Figures

| | |
|---|---|
| FIG. 5A | FIG. 5B |
| FIG. 5C | FIG. 5D |
| FIG. 5E | FIG. 5F |

GAS PANEL WITH IMPROVED DRIVE CIRCUITS

BACKGROUND OF THE INVENTION

The present invention is directed to an A.C. coupled gas-discharge display device of the multi-digit or character indicator type and more particularly to a drive circuit for driving such a display related to multiplexed operation of such display devices to provide an improved operation of the display device.

It is well-known that an electroluminescent cell can be interposed between first and second electrodes and that, upon the application of a suitable electric potential between the first and second electrodes connected to the cell, the cell will become luminescent because of the ionization which occurs within the cell. This characteristic lends itself quite readily for use in a display panel. A control circuit for driving such display is shown in U.S. Pat. No. 3,614,769, which issued Oct. 19, 1971 on the application of William E. Coleman et al. and assigned to the assignee of the present invention.

As disclosed in the Colemen et. al. patent, the application of an electric field to an electroluminescent cell causes ionization to occur within the cell. The electric field imparts energy to electrons which collide with other atoms, thus releasing other electrons. This electron multiplication process continues until breakdown occurs, at which time ignition occurs, that is, a gaseous discharge occurs within the cells, causing positive charges to be deposited on the cell walls connected to the cathode and electrons to be deposited on the cell walls connected to the anode. The charges deposited on the cell walls are trapped because of the capacitive coupling effect exerted by the cell walls. Since positive ions are attached to the cathode wall and electrons are attached to the anode wall, the wall charge will be of a polarity opposite to that of the electric field which instigated the gas discharge. In other words, the voltage contributed by the wall charge will be opposite in polarity to the applied electric field. Thus, it can be seen that after discharge occurs, the total voltage impressed on the cell will be the algebraic sums of the voltages applied to the cell terminals plus the voltage contributed by the wall charge, which after ignition is negative with respect to the applied voltage, therefore resulting in a decreased cell voltage. The gas discharge which occurs in the cell continues until the wall voltage builds up to a certain value. This value is given by the relationship $V_A - V_W < V_E$, where $V_A$ is the applied voltage, $V_W$ is the wall voltage, and $V_E$ is the voltage below which the cell is extinguished. In order to energize the cell again using the same magnitude of applied voltages, it is necessary to reverse the polarity of the applied voltages to the cell, thereby impressing an applied voltage across the cell which is adequate with the wall voltage left from the previous discharge, thus permitting a gas discharge to occur in the reverse direction. Since the wall charge is trapped within the cell, the wall voltage will always oppose the voltage which initiated the gas discharge.

Information is visually displayed in the display device in the form of characters, the characters being formed by a group of electroluminescent cells or segments containing an encapsulated gas. The illumination is provided by a gaseous discharge within the cell which occurs upon the application of an electric field at the cell terminals, thereby igniting the cells. Control circuits are provided for selectively energizing the electroluminescent cells, each of which is capacitively coupled between two electrodes, such as a segment electrode and a column electrode. The number of segment electrodes is determined by the number of cells per character, and the number of column electrodes is determined by the number of characters in the display device. Electrically, this takes the form of a matrix in which the columns are called segment electrodes. Each individual cell connected in a column is called a segment cell, and the segment cells in each row are connected to a character column electrode. One end of each segment electrode and each column electrode is connected to a potential source through appropriate drive transistors. The other ends of the segment and column electrodes are each connected to ground through individual driver transistors. The energization of selected segment cells in addition to the energization of a particular column electrode determines the character to be displayed. Circuit means are provided for logically controlling the drive transistors.

In order to illuminate a selected cell for display purposes, it is necessary to alternately energize the electrodes connected to the selected cells. In a multiplexing operation of each character, the cathode electrodes in each of the characters is connected to a common driver together with a selected number of characters connected to a common column driver. Each segment in the characters is connected to a segment driver. During a multiplexing operation, the display's control logic uses both the common column and segment drivers to designate which cells are to be energized. This operation occurs on a scanned "one column at a time" basis. A blanking period is required between the selection of the columns to enable the segment data to be transmitted to the control logic. Because of the large voltages involved to drive currently available displays, it has been found that the cost of the high voltage transistors necessary to handle the drive voltages increase the cost of the displays since intensity of the brightness of the electroluminescent cells is directly proportional to the frequency of switching the voltage level between a firing voltage and a non-firing voltage. These high voltage drivers have slow transition times where operating voltage levels are concerned. This operating characteristic limits the operating frequency of the drivers which directly affects the intensity of the display.

Various methods have been set forth to improve the operation of the plasma display. In the U.S. Patent to Johnson et al., U.S. Pat. No. 3,513,327, which issued on May 19, 1970, there is included the use of transformers in the driver circuits in which the secondary windings of the transformers supply the voltage to one of the elements of the display upon the application of an energizing pulse. The circuitry for controlling the operation of each of the transformers in such Johnson et al. reference is very complicated and therefore costly which, together with the cost of each of the transformers, limits the attractiveness of such a driver circuit.

It is therefore the principal object of the present invention to provide a gas display device which is brighter than those of the prior art. It is a further object of this invention to enable a gas display device to increase its luminescence utilizing low power, low voltage integrated circuit drivers. It is another object of this invention to provide a low cost gas display device having a minimum number of circuit elements that exhibits an increase in display brightness over displays presently available.

SUMMARY OF THE INVENTION

These and other objects of the invention are fulfilled by providing driver circuits for the electroluminescent cells which include multiple secondary windings of an AC driven transformer each coupled in series with the driver transistors where both the secondary windings of the transformer and the transistor supply the total voltage for firing the cells of the display. Applying an AC voltage to the primary winding of the transformer enables the secondary windings to continuously provide a level voltage output which constitutes a high percentage of the total voltage required to fire the display. This construction allows the voltage required to be applied by the driver transistors in firing the cells to be low, enabling lower voltage transistors to be employed in the driver circuits and thereby allow further increases in the speed of the switching cycle of the transistors therefor, thereby providing a brighter display. Out of phase clock signals operate both the transformer and the power transistors to provide the required voltage level at selected cells to fire the cells.

DESCRIPTION OF THE PREFERRED EMBODIMENT

Figure 1:
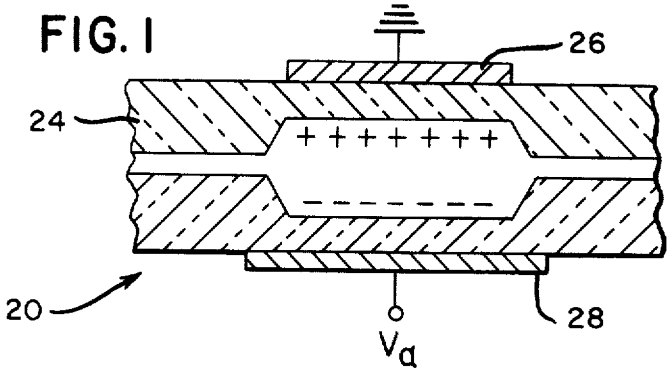
FIG. 1 is a sectional view of a gas-discharge cell that can be utilized with the present invention.

FIG. 1 is a representation of an electroluminescent display cell which may be used with the present invention. The cell generally indicated by the numeral 20 usually comprises a glass sandwich 24 encapsulating a gas at a particular pressure. A discharge which occurs in the encapsulated gas and provides sufficient illumination for use in visual displays will occur within the cell 20 upon the application of a particular potential $V_a$ between the electrodes 26 and 28, the electrodes being located externally of the cell in order to utilize its capacitive properties. The electrons and ions created by the discharge will attach to the anode and cathode sides of the glass cell, respectively, to produce what is commonly referred to as a wall charge. The voltage $V_W$ attributed to the wall charge has a polarity opposite to that of the applied voltage $V_a$ which initiated a discharge. Upon reversal of the applied voltage $V_a'$, the voltages $V_a$ and $V_W$ will be additive, thereby causing another discharge to occur and permitting the use of a voltage $V_a$ which can be at a lower level than that which originally initiated a discharge.

Figure 2:
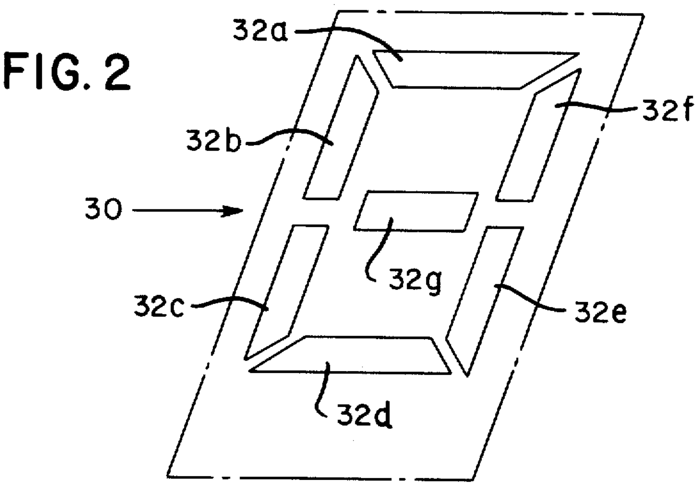
FIG. 2 is a plan view of a representative character display.

FIG. 2 shows a plurality of cells of the type illustrated in FIG. 1 combined to form a conventional 7-bar code matrix 30 comprising seven individual segments 32*a*-32*g* inclusive. Individual ones of these segments can be selectively energized to form desired numerical characters. A similar matrix of fourteen individual segments are arranged in a manner that is well-known in the art to form characters of the alpha code.

Figure 3:
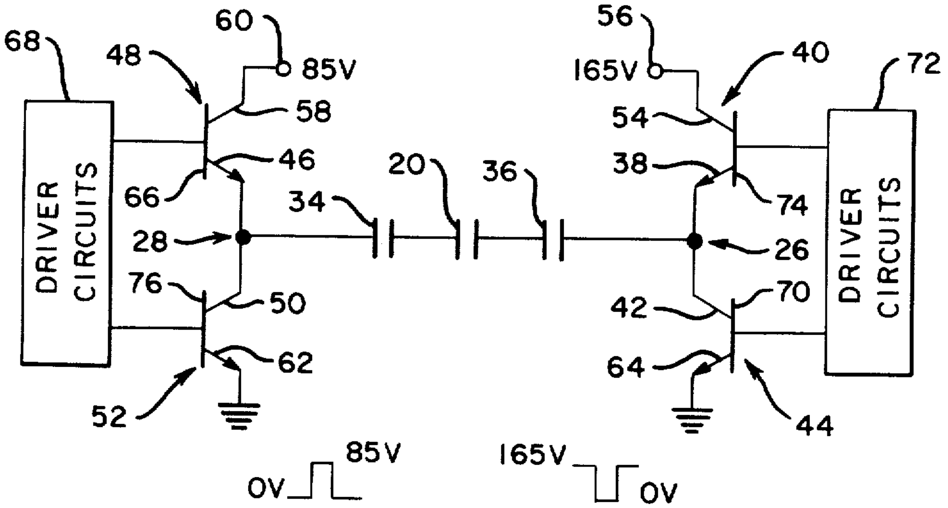
FIG. 3 is a schematic diagram of a representative gas display cell.

The electroluminescent cell 20 of FIG. 1 is diagrammatically illustrated in FIG. 3 as being capacitively coupled to the cell electrodes 26 and 28, in which at least one of the electrodes is transparent for the passage of light. Although two coupling capacitances 34 and 36 are illustrated because of the glass dielectric between each exterior electrode and the adjacent interior glass wall surface, one of such coupling capacitors could be eliminated and the combination would still be referred to as a capacitively coupled cell.

The electroluminescent cell electrode 26 (FIG. 3) is coupled to the emitter 38 of an NPN transistor 40 and the collector 42 of an NPN transistor 44. Similarly, the electroluminescent cell electrode 28 is coupled to the emitter 46 of an NPN transistor 48 and the collector 50 of an NPN transistor 52. The collector 54 of the transistor 40 is connected to a voltage source 56 of 165 volts, while the collector 58 of the transistor 48 is connected to a voltage source 60 of 85 volts. The emitters 62 and 64 of the transistors 52 and 44 respectively are connected to ground.

The base 66 of transistor 48 connects with segment driver circuits 68 while the base 70 of transistor 44 is connected with column driver circuits 72. As will be explained in more detail hereinafter, the transistors 48 and 44 will be switched to a conducting state by signals transmitted from the driver circuits 68 and 72, thereby impressing 85 volts across the cell electrodes 26 and 28. The voltage necessary to ignite the cell 20 is somewhere between 165 and 250 volts, which is attained when the 165 volts appearing on the collector 54 of the transistor 40 is combined with the 85 volts appearing on the collector 58 of the transistor 48. After the voltage appearing at the electrode 28 has risen to a level of 85 volts, the transistors 48 and 44 are switched into a non-conducting state by the drive signals received from the driver circuits 68 and 72 and the transistors 40 and 52 are driven into a conducting state by signals transmitted from such driver circuits 68 and 72. This switching action results in the 165 volts being impressed on the electrodes 26 and 28 of the cell 20 by means of a current path which extends from the emitter-collector path of the transistor 40, through the cell 20 with the coupling capacitors 34 and 36 and through the collector-emitter path of the conducting transistor 52 to ground.

The impressing of the 165 volts on the electrode 28 (FIG. 3) combined with the 85 volts which have remained on the electrode 26 due to the capacitive action of the cell 20 in a manner that is well-known in the art results in the cell 20 reaching a voltage level at which a gaseous discharge occurs. The igniting of the cell 20 and the subsequent discharge causes a wall charge to be deposited on the inside glass surface walls of the cell 20. The wall charge produces a wall voltage opposite in polarity to that of the applied voltage which initially drove the cell 20 into ignition. Assuming, for purposes of illustration, that the wall charge in the cell 20 contributes a voltage of 85 volts, it is seen that the cell voltage drops to 85 volts after ignition, since the wall voltage $V_W$ is negative with respect to the applied voltage $V_a$. The transistors 40 and 52 are subsequently switched back into a conductive state to again impress 165 volts at the electrode 26. Upon this occurrence, the voltage across the cell 20 is again sufficiently high to drive the cell into ignition. The above operation is repeated so long as the transistors 40 and 52, together with the transistors 48 and 44 are alternately pulsed into conduction. In the cell illustration of FIG. 3, it is seen that the transistors 40 and 52 are required to carry the 165 volts which limits the switching speed of presently available transistors. The present invention eliminates the requirement of a high voltage supply for the transistors 40, 44, 48 and 52 by preferably inserting the secondary windings of a single transformer, i.e., transformer having single primary and multiple secondary windings, or, alternatively, the secondary windings of a plurality of transformers between the electrode 26 and the cell 20, and enabling the secondary windings to constantly supply the greater part of the 165 volts required to fire the cell 20 in a manner to be described more fully hereinafter.

Figures 4, 6:
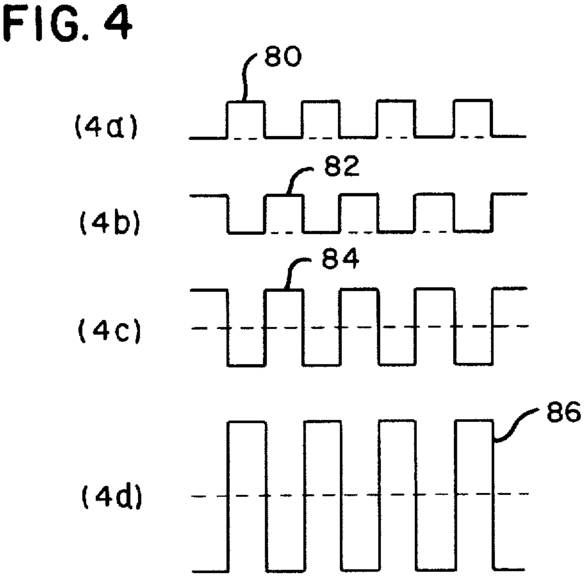
FIG. 4 shows a plurality of waveforms used in the operation of the circuit shown in FIGS. 5A-5F inclusive.
FIG. 6 is a diagram showing the manner in which FIGS. 5A-5F inclusive are arranged with respect to each other to form the driver circuits.

Referring to FIG. 4, there is shown the voltage waveforms of the drive pulses which are used to control the operation of the cell 20 (FIG. 3). FIG. **4*a* illustrates the segment drive pulses 80 having an amplitude of approximately 15 volts transmitted by the transistors 44 and 48 to control the operation of the cell 20. FIG. 4*b* shows the column drive pulses 82 transmitted by the transistors 40 and 52 which are of equal amplitude with the drive pulses 80 but out of phase therewith. FIG. 4*c* illustrates voltage pulses 84 which in actual practice are approximately ten times the amplitude of the column drive pulses 82 and which are applied to the cell 20 by the secondary winding of the transformer in phase with the pulses 82. FIG. 4*d* illustrates the resulting firing pulses 86 applied to the cell 20 which are the algebraic sum of the pulses 80, 82 and 84. When a cell 20 is to be turned off, the pulses 80 and/or the pulses 82 are removed therefrom, thereby reducing the voltage level applied to the cell to a point below the firing level thereof. It will be seen that the voltage pulses 80 and 82 required to be handled by the transistors 40, 44, 48 and 52 are of relatively low amplitude with respect to the voltage pulses 84 of the secondary windings of the high voltage transformer coupled to the cell 20**, thereby enabling the voltage to be switched at a high frequency which in time increases the intensity of the brightness of the cell display.

Figure 5A:
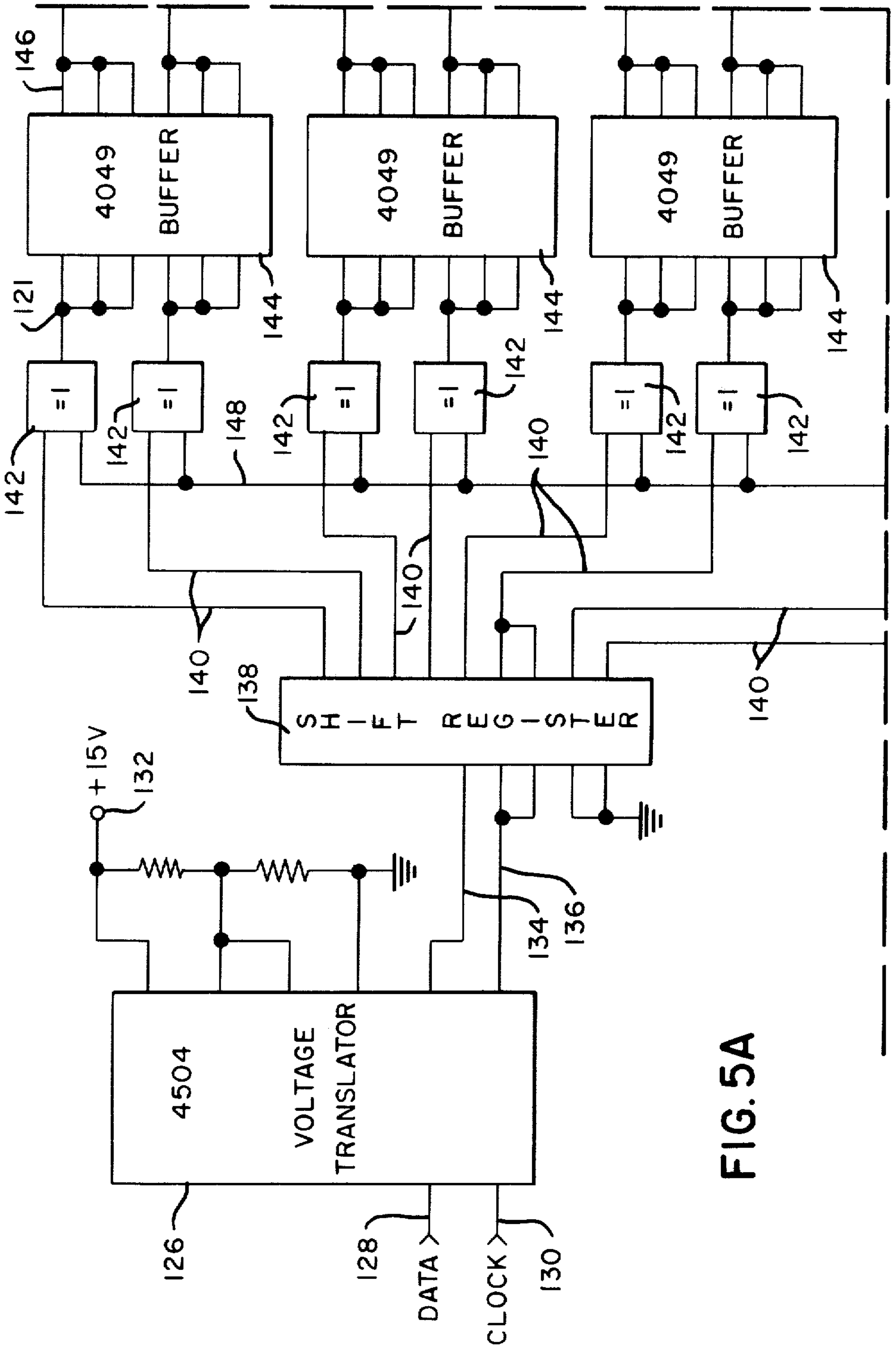
FIGS. 5A-5F inclusive are schematic diagrams of the basic driver circuits for energizing a cell in accordance with the present invention.
Figure 5B:
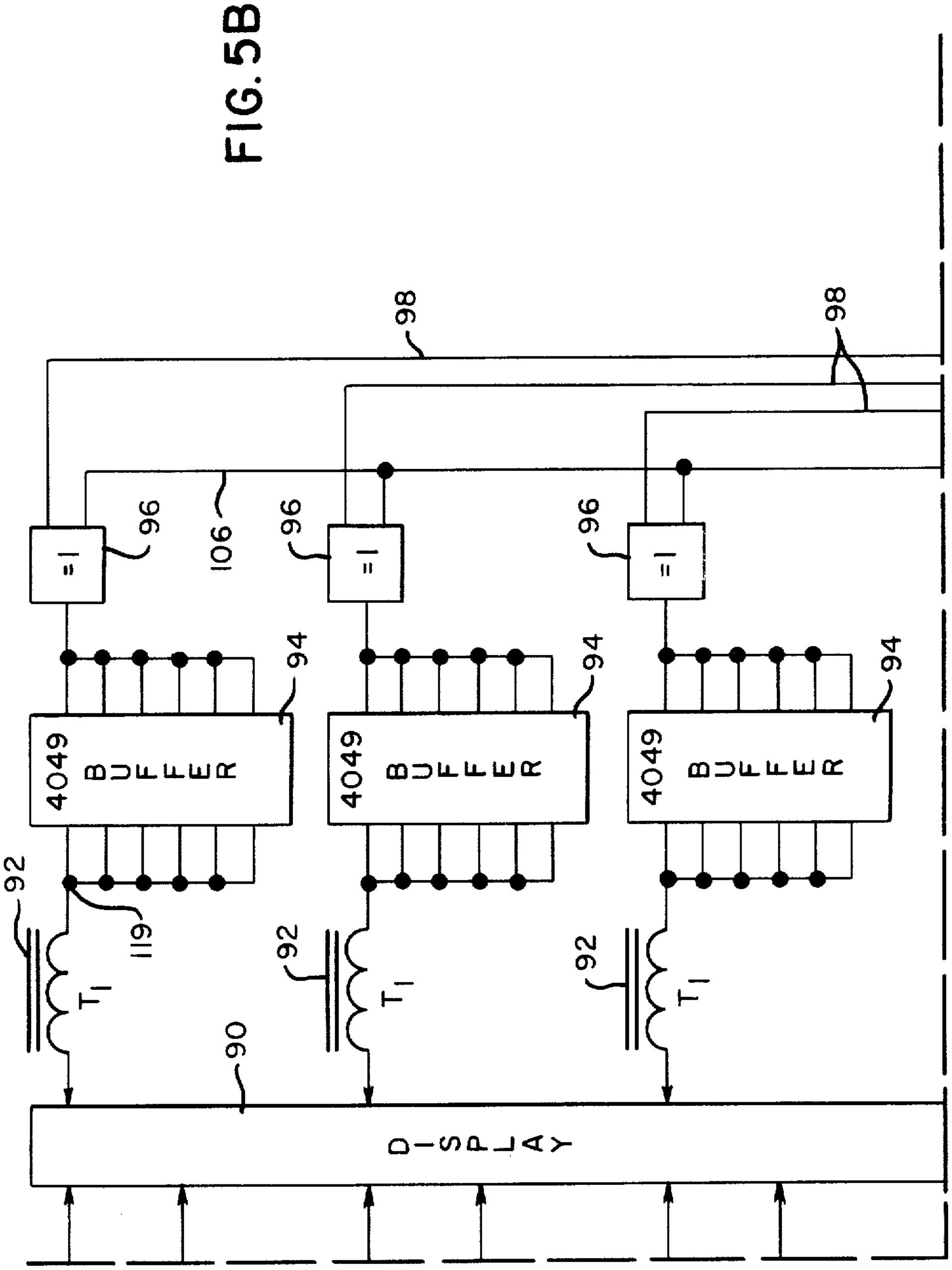
Figure 5C:
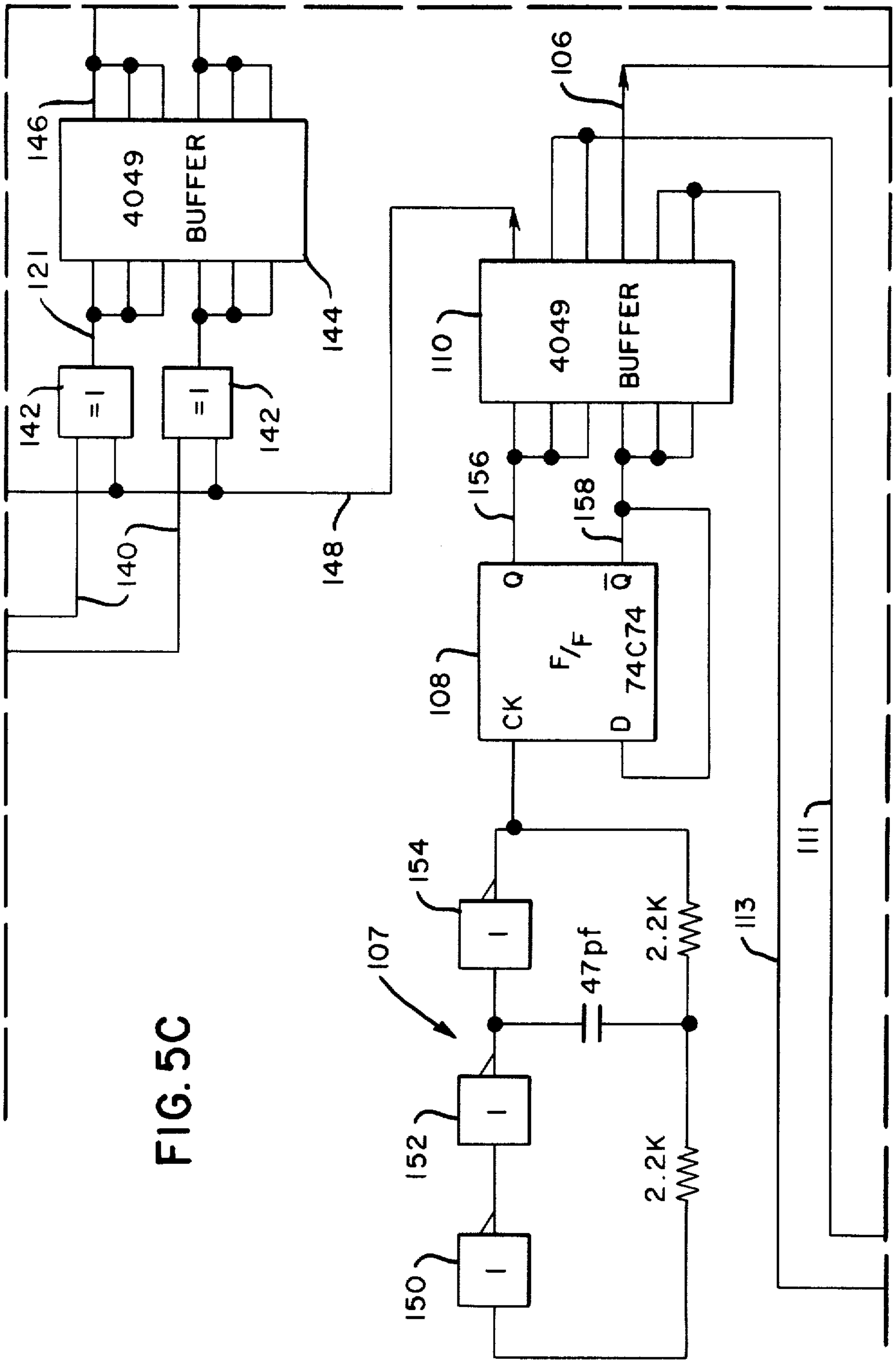
Figure 5D:
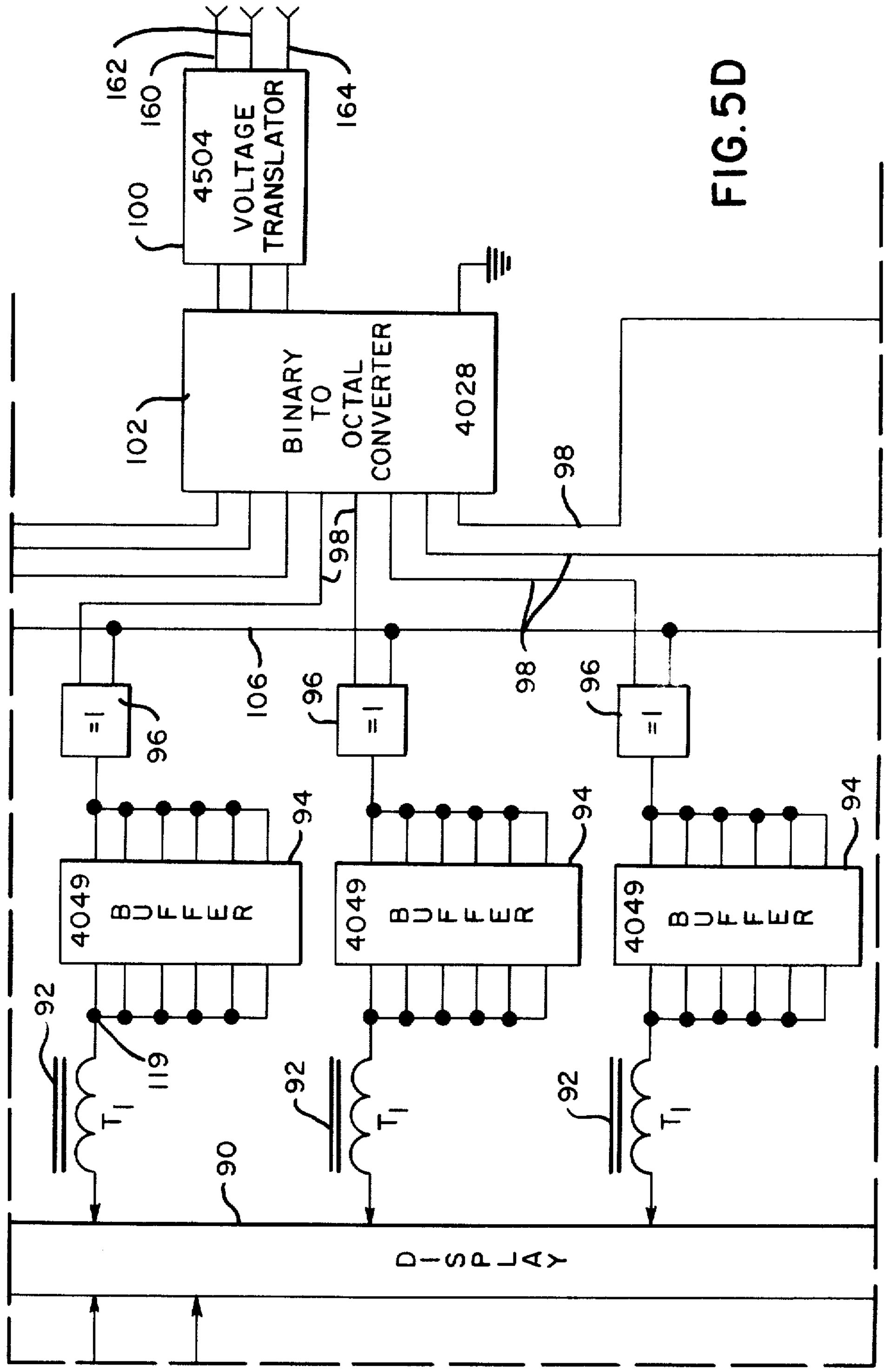
Figure 5E:
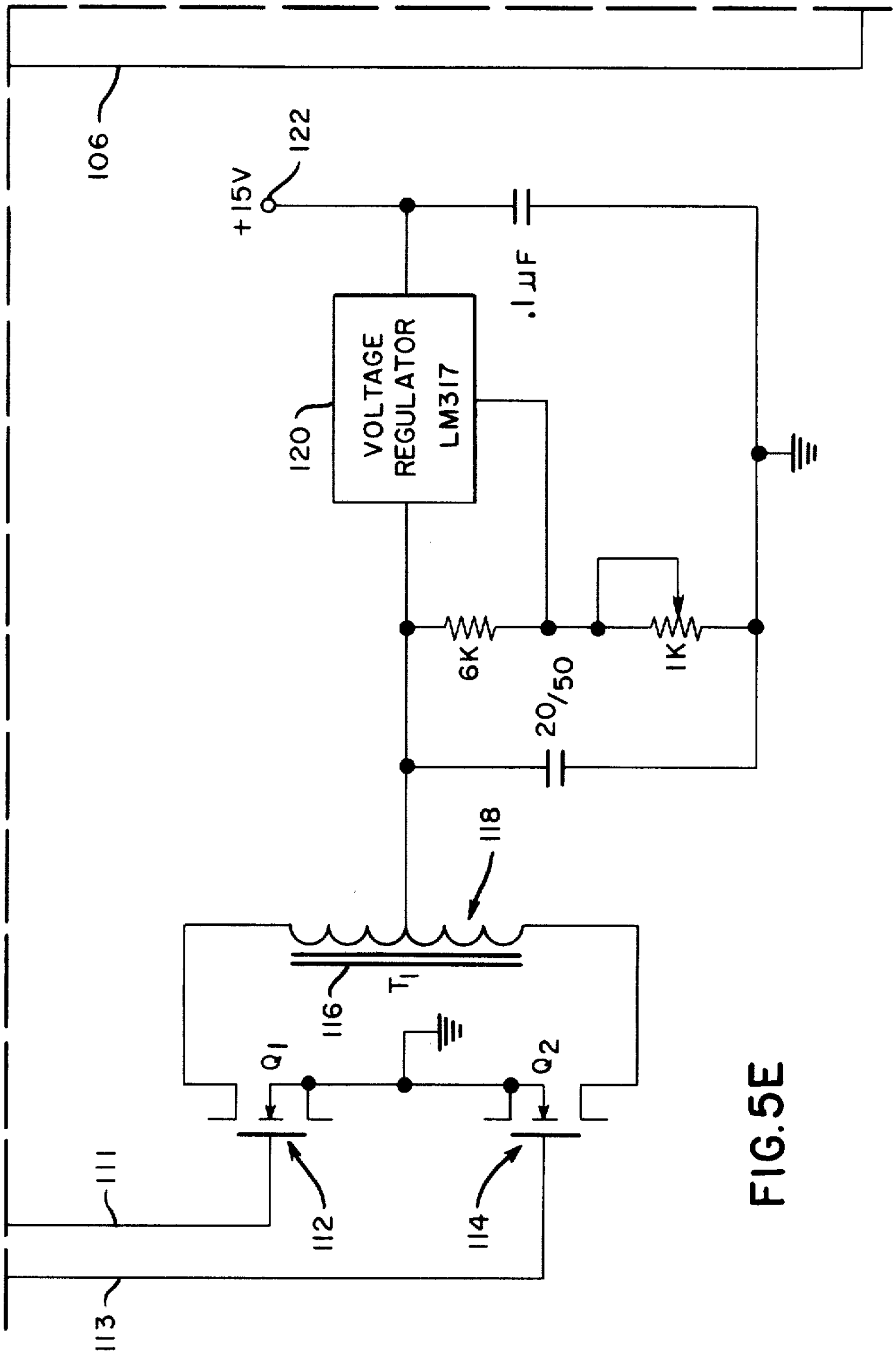
Figure 5F:
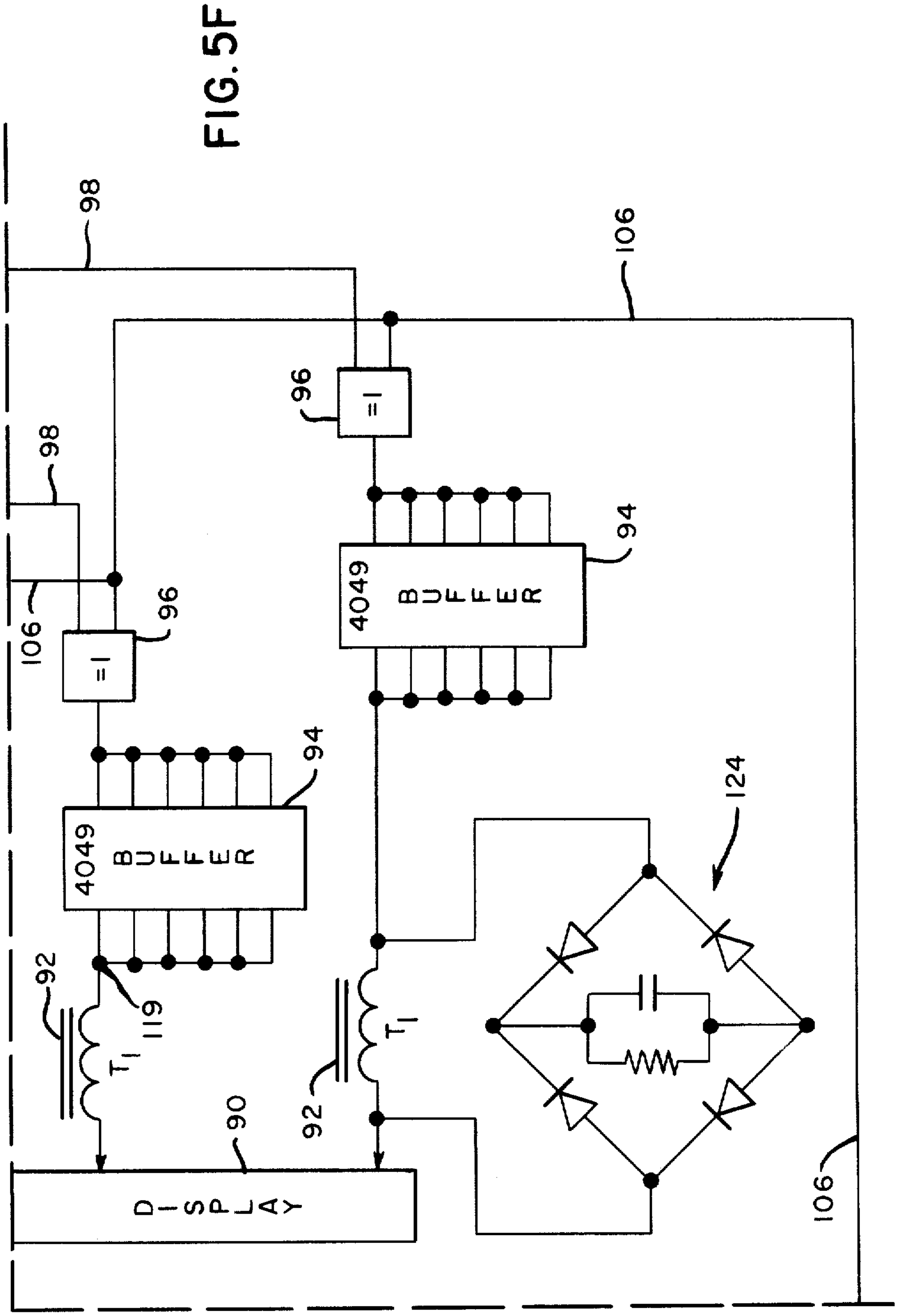

Referring now to FIGS. 5A-5F inclusive, arranged in the manner as shown in FIG. 6, there is disclosed the logic circuit in block form for controlling a gas panel display composed of a series of matrixes 30 (FIG. 2) each composed of individual cell 20 segments **32*a*-32*g* inclusive which may form a numerical character or an alphanumerical character, the latter character requiring fourteen such segments. Each column of segments in a display 90 (FIGS. 5B, 5D and 5F) is coupled to one end of the secondary winding 92 of a voltage transformer 118 (FIG. 5E) whose other end is connected through a plurality of junctions 119, each corresponding to the electrode 26 (FIG. 3), to a part No. CD4049 buffer 94 in which the transistors 40 and 44 (FIG. 3) are located. Unless otherwise stated, all IC circuits designated by a part number are commercially available from the RCA Corporation of Somerville, N.J. The input to each of the buffers 94 (FIGS. 5B, 5D and 5F) is connected through an Exclusive OR gate 96 to a column select drive circuit which includes a #4504 voltage translator 100 receiving a three binary bit column select signal and a #4028 binary to octal converter which converts the three binary bits to an energizing signal appearing on only one of the eight input lines 98 to the Exclusive OR gates 96. The other input of the Exclusive OR gate 96 is connected over line 106 (FIGS. 5C, 5E, 5F, and 5B and 5D) to a pulse generating circuit which includes an RC oscillator generally indicated by the numeral 107, a #74C74 D-type flip-flop 108 (FIG. 5C) and a #4049 buffer 110. The output lines 111 and 113 of the buffer 110 are coupled to a pair of FET transistors generally indicated by the numerals 112 and 114 (FIG. 5E) respectively, each of which is coupled in series with the primary winding 116 of the high voltage transformer 118—whose secondary windings 92 are coupled to each of the segments in the display 90 in the manner described previously. The transistors 112 and 114 are commercially available from the Silonics Corporation of Santa Clara, Calif., as part No. VN88AF. The primary winding 116 of the high voltage transformer 118 is coupled to #LM317 voltage regulator 120 which in turn is connected to a 15 volt voltage source 122 (FIG. 5E). The regulator 120 is adjusted for each gas display 90 to supply a voltage to the primary winding 116 of the transformer 118 which compensates for the display characteristics. As shown in FIG. 5F, a damping circuit generally indicated by the numeral 124 is connected across the secondary windings 92 of the voltage transformer 118 for damping oscillation occurring in the square wave output of the secondary winding 92**.

Referring to FIG. 5A, there is shown one embodiment of a signal input circuit which includes a #MC1 4504 voltage translator 126 coupled to a data input line 128 and a clock input line 130. The translator 126 is commercially available from the Motorola Corporation of Phoenix, Ariz. As is well-known in the art, eight binary bits are transmitted over line 128 for selecting the seven segments **32*a*-32*g* inclusive (FIG. 2**) plus a decimal segment (not shown) to display a numerical character while fourteen or more binary bits are required to display an alpha-numeric character. If a segment is to be turned on, the binary bit will be at a +5 volt level, while if the segment is to be turned off, the voltage level is at 0 volts. Both operations occur while a clock pulse is generated.

The voltage translator 126 is coupled to a 15 volt power source 132 (FIG. 5A) and will output the data bits over a line 134 at a 12-16 volt amplitude to a #4015 shift register 138 which converts the serial input data to parallel output data over lines 140 to one of a series of Exclusive OR gates 142 in accordance with the segments **32*a*-32*g* required to be energized. The clock signal appearing on input line 130 to the voltage translator 126 is outputted over a line 136 to the shift register 138, enabling the shift register to clock the data out over the lines 140. Each of the Exclusive OR gates 142 is coupled to a #4049 buffer 144 (FIGS. 5A and 5C) which contains the transistors 48 and 52 (FIG. 3), and which buffers 144 are coupled to the display 90 (FIGS. 5B, 5D and 5F) over lines 146. The other input to each of the Exclusive OR gates 142 is coupled over line 148 to the #4049 buffer 110 of the voltage supply circuit (FIG. 5C). The coupling of the Exclusive OR gates 142 to the buffers 144 occurs through the junction 121 which corresponds to the electrode 28 (FIG. 3). The occurrence of a high pulse on the output of gate 142 will enable one of the segments 32*a*-32*g* in the display 90** to be energized in accordance with the energizing of the column in which the segment is connected.

In the operation of the display device 90, a plurality of binary bits representing the segments 32 (FIG. 2) to be energized will be transmitted over line 128 to the voltage translator 126 which, under the control of the clock signals appearing on input line 130, will output the binary bits at an amplitude of between 12 and 16 volts over line 134 to the shift register 138 (FIG. 5A) in the manner described previously. Each binary bit is transmitted over one of the lines 140 to one input of one of the Exclusive OR gates 142 which is enabled by clock signals appearing on the input line 148 and which are generated in an oscillator control circuit 107 comprising three inverters 150, 152 and 154 (FIG. 5C). In accordance with the values of the RC circuit element shown in FIG. 5C, a 2 MHz. output pulse is inputted to the clock input of a D flip-flop 108 which outputs over its Q and $\bar{Q}$ output lines 156 and 158 out of phase clock signals to the buffer 110 which is equal to one half the frequency of the output pulse of the inverters 150–154 inclusive or 1 MHz. The out of phase 1 MHz. output clock signals appearing on lines 106 and 148 of the buffer 110 will cause the Exclusive OR gates 142 (FIGS. 5A and 5C) and the Exclusive OR gates 96 (FIGS. 5B, 5D and 5F) to be alternately enabled to output the 15 volt drive pulses 80 and 84 (FIG. 4) appearing on the input lines 140 and 98 respectively. The use of the Exclusive OR gates 142 (FIGS. 5A and 5C) and 96 (FIGS. 5B, 5D and 5F) to input the 15 volt drive pulses to the display 90 will add 30 volts to the firing voltage when both the segment Exclusive OR gate 142 and the column Exclusive OR gate 96 are simultaneously operated by the out of phase clock signals appearing on lines 148 and 106 and subtract the 30 volts from the firing voltage when the Exclusive OR gates 142 and 96 are operated in phase, enabling a wider range for the firing voltage to occur. During this time, the secondary winding 92 will be continuously supplying the voltage pulses 84 (FIG. 4C) having a level of 165 volts.

Appearing on the input lines 160, 162 and 164 (FIG. 5D) is a three bit binary word selecting one of the columns in the display device 90 to be energized. The input binary signals are transmitted to the voltage translator 100, being part #4504 like the voltage translator 126 (FIG. 5A), which translator 100 transmits the signals at a voltage amplitude of 15 volts to the binary to octal converter 102 which in turn will enable only one of its output lines 98 to output the 15 volts column select pulse to one of the Exclusive OR gates 96. As previously described, the gate 96 is enabled by the 1 MHz. clock signals appearing on line 106, which signals are outputted from the oscillator circuit 107 and the buffer 110 (FIG. 5C). In accordance with the timing of the signals appearing at its inputs, one of the Exclusive OR gates 96 will output the 15 volts pulse to one of the buffers 94 (FIG. 5B, 5D and 5F). The output of each of the buffers 94 is coupled through the junctions 119 to one end of the secondary winding 92 of the transformer 118 (FIG. 5E). As shown in FIG. 4C, the secondary windings 92 of the transformer 118 (FIG. 5C) will output 165 volts upon the energizing of the primary winding 116 of the transformer 118. The primary winding 116 (FIG. 5E) of the transformer 118 is oscillated by the alternate operation of the switching transistors 112 and 114 in response to receiving the out of phase clock signals from the buffer 110. Since the output intensity of the segments 32*a*–32*g* inclusive (FIG. 2) is proportional to the frequency at which they are enabled, the continuous switching of the transistors 112 and 114 at a 1 MHz. frequency allows the segments 32 (FIG. 2) to produce a high intensity of display. The use of the secondary windings 92 of the transformer 118, which is continuously operated in phase with the column select signals appearing on the output of the buffers 94, together with the out of phase segment select signal will produce a firing voltage to the segments 32 at a high frequency of operation while requiring the segment and column select signals to be at a relatively low voltage amplitude, thus enabling the display to be constructed at a low cost.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A control circuit arrangement for a gas-discharge device having a plurality of individual cells in which each cell has a pair of insulated electrodes defined by respective first and second conductors comprising:
   - a source of low level voltage pulses insufficient to discharge the electrodes in a cell;
   - first switching means adapted to couple said low level voltage pulses to said first conductor for supplying said voltage pulses to one of said electrodes when operated;
   - second switching means adapted to couple said low level voltage pulses to said second conductor for supplying said voltage pulses to the other of said electrodes when operated;
   - a transformer member having its primary windings coupled to said low level voltage source and its secondary windings coupled in series to said second conductor, said secondary windings adapted to supply a high level voltage pulse to said second conductor insufficient to discharge the electrodes in the device upon the energizing of the primary windings;
   - and control means coupled to said first and second switching means and said primary windings for alternately operating said first and second switching means and continuously energizing the primary windings of the transformer to supply said low and high level voltage pulses to said conductors, whereby the voltage pulses applied to said electrodes are sufficient to effect discharge therebetween.

2. The control circuit of claim 1 in which said primary winding is coupled to said source of low level voltage pulses, said control means includes means for generating a plurality of clock signals and a plurality of third switching means coupled to said clock generating means and said primary winding, said third switching means operated by said clock signals to switch the directional flow of said low level voltage pulses to produce said high level voltage pulse in said secondary windings.

3. The control circuit of claim 1 in which said control means further includes gating means coupled to said first and second switching means and said clock generating means, said control circuit further includes means for generating control pulses for selecting the devices to be fired, said control pulse generating means coupled to said gating means to enable said gating means to output said clock signals to selected first and second switching means operating said switching means whereby said low and high level voltage pulses are applied to the electrodes in the devices selected, thereby discharging said selected devices.

4. The control circuit of claim 3 in which said gating means comprises Exclusive OR circuits.

5. The control circuit of claim 3 in which said clock generating means includes a source of clock pulses which is further coupled to said third switching means and includes a bi-stable device coupled to said source of clock pulses for outputting first and second out-of-phase clock signals, said first clock signals operating said first switching means and one of said third switching means and said second clock signals operating said second switching means and another of said third switching means.

6. The control circuit of claim 5 in which said source of clock pulses comprises an oscillator member outputting clock pulses at a predetermined frequency, said bi-stable device being coupled to said oscillator member to continuously output said first and second out-of-phase clock signals at a frequency rate of one-half of said predetermined frequency.

7. The control circuit of claim 5 in which said predetermined frequency is 2 MHz.

8. A driving circuit arrangement for a gas discharge display of the type including a plurality of individual cells having a pair of insulated electrodes defined by respective row and column conductors comprising:

a source of low voltage pulses insufficient to discharge the electrodes in a cell;

first switching means coupled to said voltage source and said row conductors for supplying said voltage pulses to one of said electrodes when operated;

second switching means coupled to said voltage source and said column conductors for supplying said voltage pulses to another of said electrodes when operated;

a transformer member having its primary windings coupled to said voltage source and its secondary windings coupled to said column conductors;

means for generating a plurality of clock pulses;

control means coupled to said clock generating means and each of said first and second switching means for alternately operating said first and second switching means in response to receiving said clock pulses when enabled;

third switching means coupled to said clock generating means and the primary winding of said transformer member and operated by said clock pulses to continuously switch the current flow in said primary winding to produce a high voltage pulse in said secondary windings; and address generating means coupled to said control means and said source of first voltage pulses for outputting address signals enabling said control means to alternately operate selected first and second switching means whereby the low and high voltage pulses are applied over selected row and column conductors to discharge selected cells of said display.

9. The driving circuit of claim 8 in which said control means comprises gating means coupled to said address generator means and said clock generating means for alternately operating said first and second switching means in response to receiving an address signal from said address generating means.

10. The driving circuit of claim 9 in which said gating means comprises an Exclusive OR circuit.

11. The driving circuit of claim 9 in which said address generator means includes a shift register for selectively enabling said gating means in accordance with the row electrode to be discharged.

12. The driving circuit of claim 8 in which said clock generating means includes:

an oscillator means for outputting a plurality of clock pulses at a predetermined frequency;

a bi-stable device coupled to said oscillator means for outputting first and second out-of-phase clock signals;

and means coupled to said bi-stable device for transmitting said first and second clock signals to said control means and said third switching means enabling said low and high voltage pulses to be applied over said row and column conductors.

13. The driving circuit of claim 12 in which said predetermined frequency is 2 MHz.

14. A circuit for driving a plasma discharge display having a plurality of segment and column electrodes comprising:

a first set of switching members coupled to each of said segment electrodes;

a second set of switching members coupled to each of said column electrodes;

a source of low voltage pulses having a level insufficient to discharge said electrodes;

means for outputting said voltage pulses to selected first and second sets of said switching members;

means for generating a plurality of out-of-phase clock pulses;

gating means coupled to said first and second sets of switching members, said outputting means and said clock generating means for alternately operating said selected first and second sets of switching members upon receiving said voltage pulses from said outputting means and said out-of-phase clock pulses;

a transformer member having its primary winding coupled to said low voltage pulses and its secondary windings coupled in series to each of said second sets of switching members;

and a third set of switching members coupled to said primary winding and said clock generating means for switching the current flow in said primary winding to continuously produce a high voltage pulse in said secondary windings in response to receiving said out-of-phase clock pulses whereby the supplying of said low voltage pulses by the operation of said gating means together with the supplying of said high voltage pulse to the selected row and column electrodes respectively provides a voltage level sufficient to discharge the selected column and row electrodes.

* * * * *